Feb. 9, 1943.     R. B. JOHNSON     2,310,438
MULTIPLYING DEVICE
Filed Feb. 1, 1941     4 Sheets-Sheet 1
FIG.1.
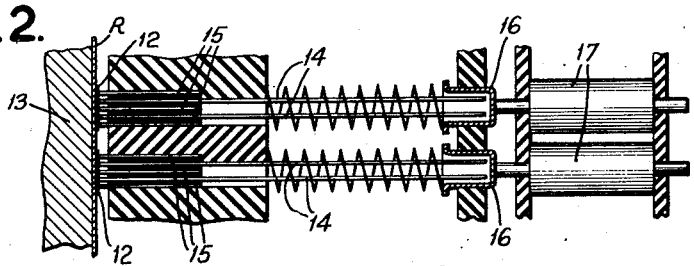
FIG.2.
FIG.4.
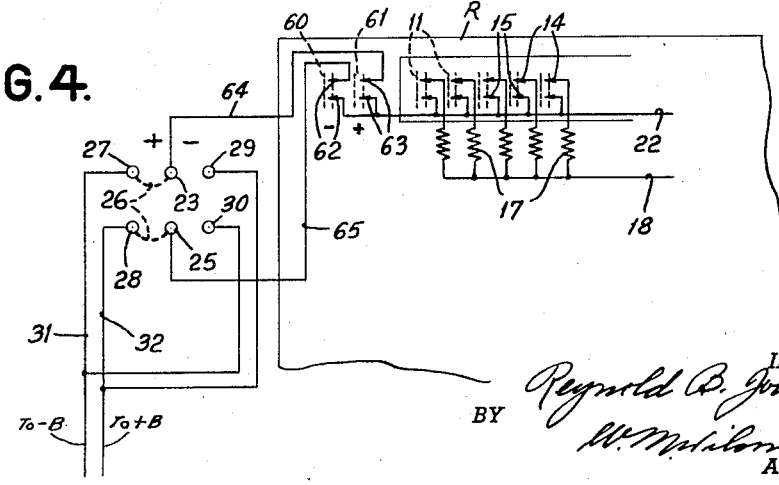
INVENTOR
Reynold B. Johnson
BY
ATTORNEY Feb. 9, 1943.    R. B. JOHNSON    2,310,438
MULTIPLYING DEVICE
Filed Feb. 1, 1941    4 Sheets-Sheet 4

INVENTOR.
Reynold B. Johnson
BY
W. M. Wilson ATTORNEY.

Patented Feb. 9, 1943

2,310,438

UNITED STATES PATENT OFFICE 2,310,438

MULTIPLYING DEVICE

Reynold B. Johnson, Binghamton, N. Y., assignor to International Business Machines Corporation, New York, N. Y., a corporation of New York Application February 1, 1941, Serial No. 377,029

5 Claims. (Cl. 235—61.8)

This invention relates to a calculating device and more particularly to a device for automatically obtaining the sum of the products of a series of pairs of factors.

A particular object of the invention resides in the provision of devices for taking into account the algebraic signs of the several factors, so that the sum obtained is an algebraic sum.

Particular utility for the device is found in aiding the solution of some fundamental psychological problems. The problems involved are discussed in a book by L. L. Thurstone entitled "Primary Mental Abilities," published April, 1938, for the Psychometric Society by the University of Chicago Press, Chicago, Illinois. It is therein stated that the performance of a task can be expressed as a linear function of what are known as "primary abilities," as, for example, where an arithmetical task which requires two hypothetical abilities, one of which may be called "number speed" and the other "number reasoning," which are weighted $A1$ and $A2$ respectively, and if we know how a person scores in each of the two fundamental abilities that are involved in the task (scores $X1$ and $X2$, respectively), then the objective performances may be stated as $$S = A1 \times X1 + A2 \times X2$$

In anaysis of this type a great many linear equations containing a great many terms are obtained, whose solution if carried out by manual methods would be extremely tedious and time consuming, especially where the sum of a series of products is desired and not the separate individual products. Thus, in the equation $$A1 \times X1 + A2 \times X2 + A3 \times X3 + \\ A4 \times X4 + A5 \times X5 + A6 \times X6 = S$$

only $S$ is of interest and $A$ and $X$ may be either $+$ or $-$.

In the psychological problems which the machine deals with, other equations are presented where the $X$'s remain constant while the $A$'s change so that we may have $$A8 \times X1 + A9 \times X2 + A10 \times X3 + \\ A11 \times X4 + A12 \times X5 + A13 \times X6 = S$$

In the practical solution, values of $X1$, $X2$, etc., are manually selectable and set up in the machine together with their algebraic sign. Values of $A1$, $A2$, etc., are designated on a record which is sensed by the machine to concurrently read all the A xalues. Circuit connections of variable ohmic value are automatically adjusted by the setting up of the X values and the sensing of the A values to direct an amount of current proportional to the value $S$ from a suitable source through an electrical indicating meter.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a part of a record sheet on which several values are represented by marks made in designated positions.

Fig. 2 is a detail of a part of the sheet sensing devices.

Figure 3:
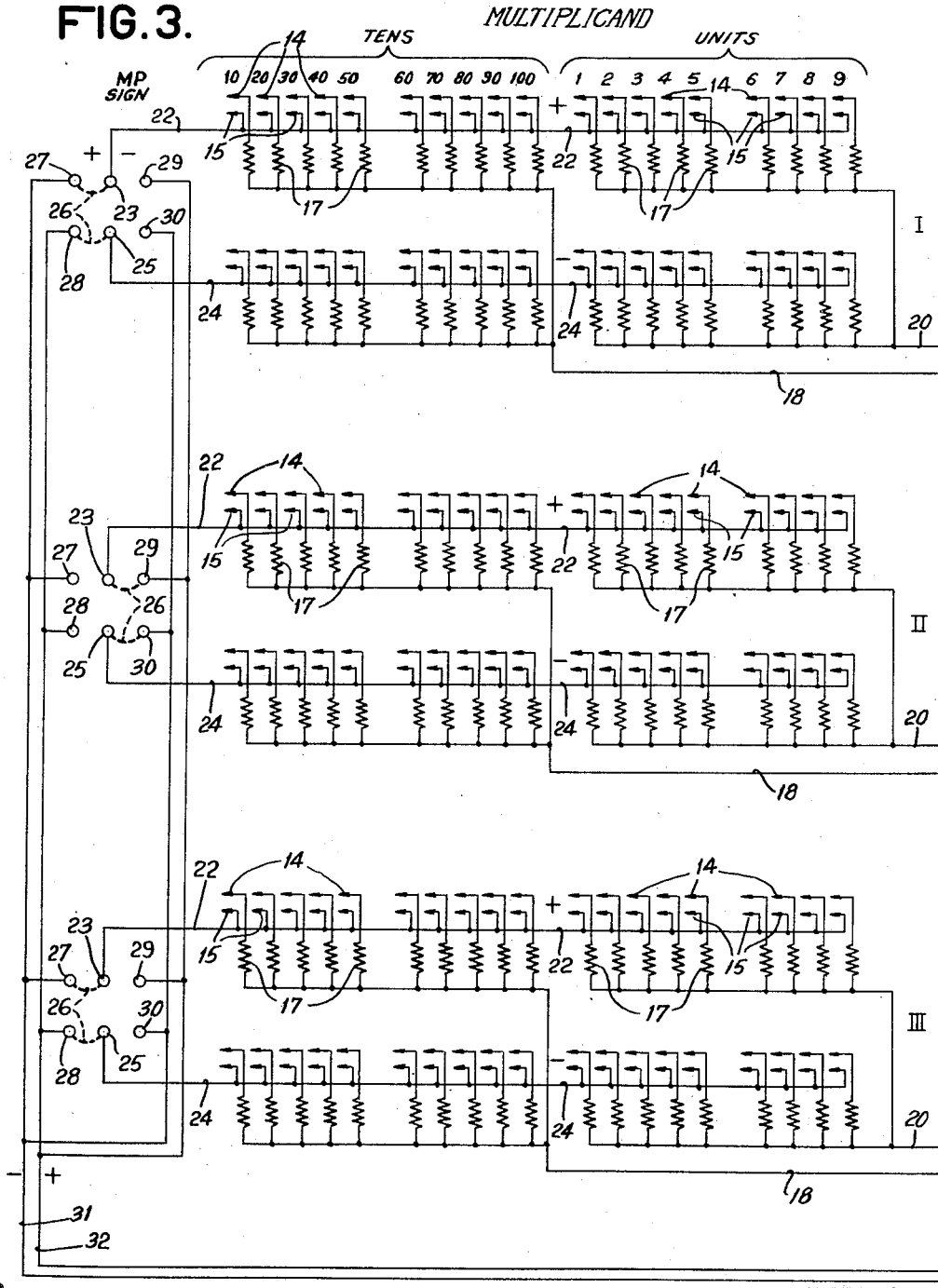
Figure 3A:
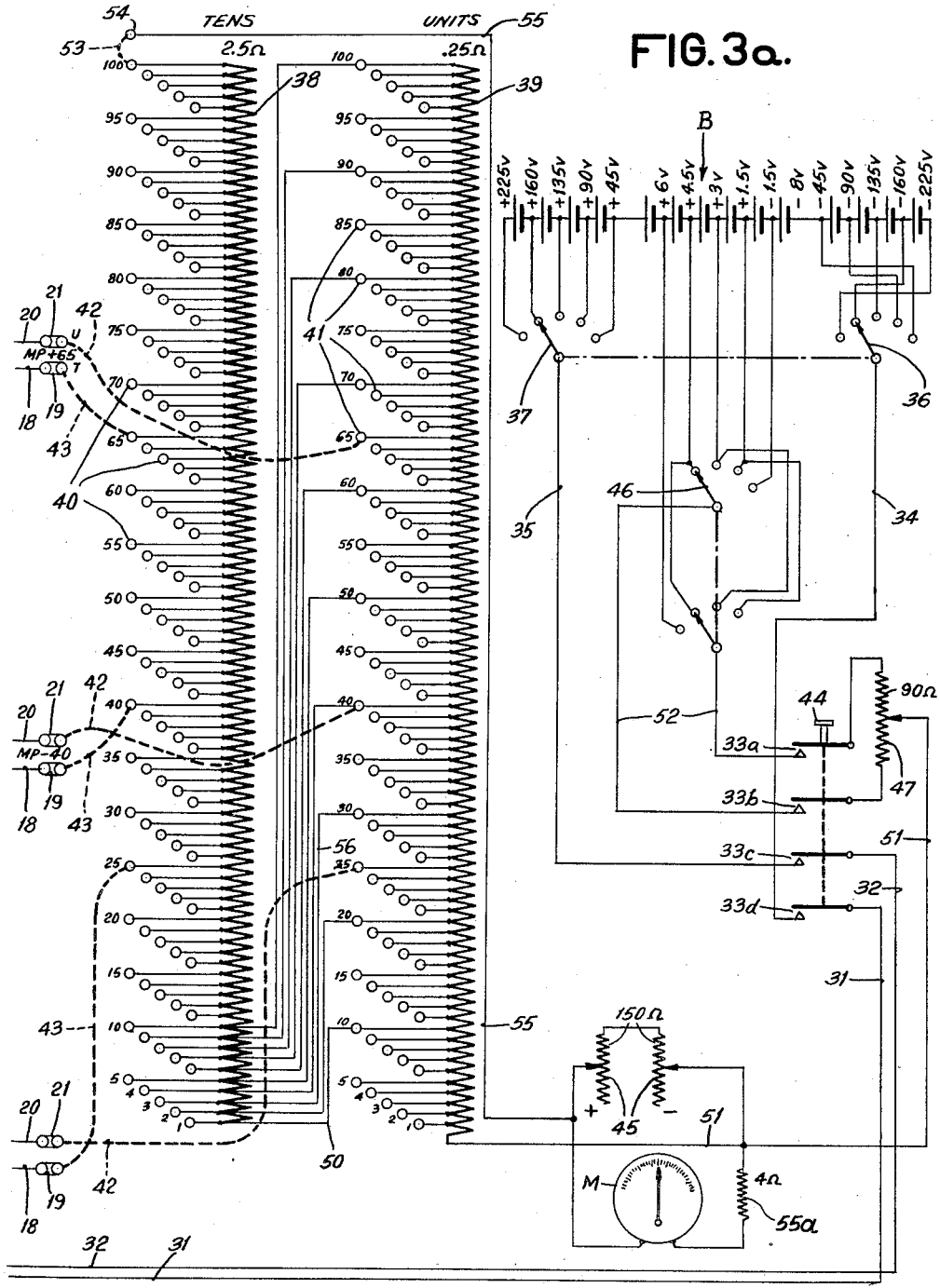

Figs. 3 and 3a taken together constitute a wiring diagram of the essential circuit connections of the device.

Fig. 4 shows a modified form of circuit arrangement.

Figure 5:
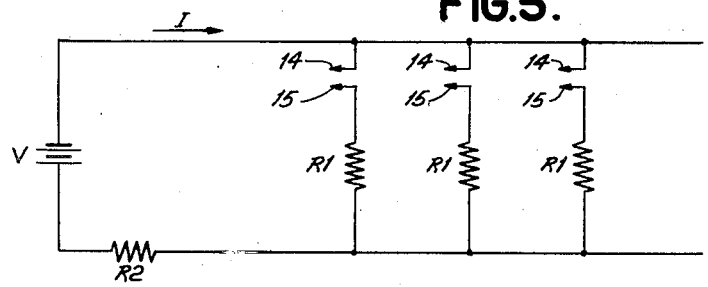
Figure 6:
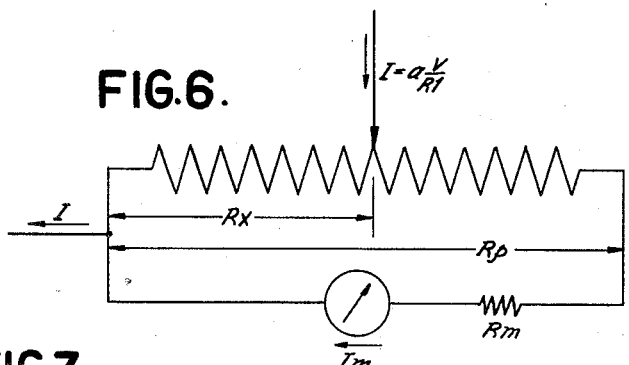
Figure 7:
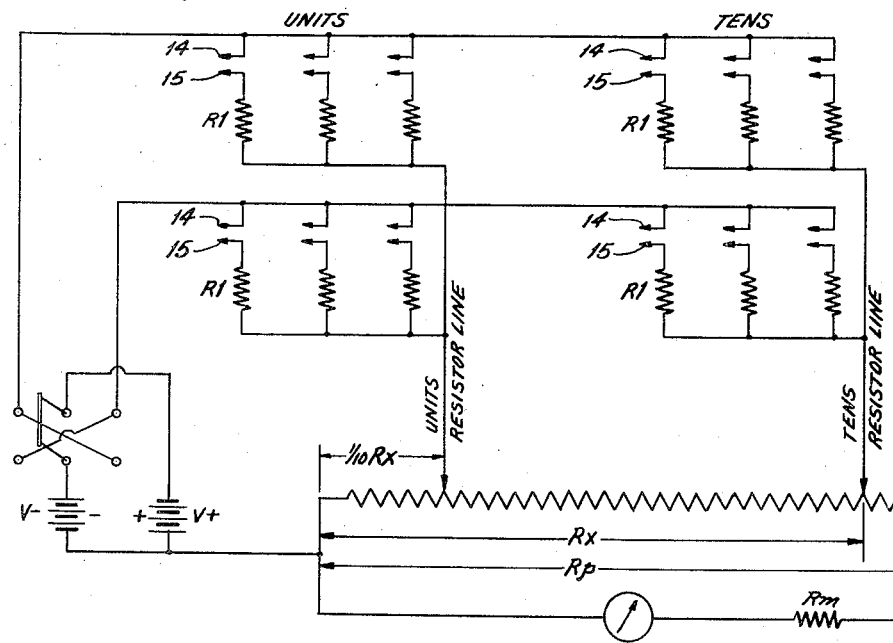

Figs. 5, 6 and 7 are diagrams illustrating the electrical principles underlying the arrangement of the invention.

The record sheet

In Fig. 1 is shown a portion of the record sheet R upon which several multiplicand amounts may be represented in a manner now to be explained. The sheet R is divided into a number of boxes 10, in each of which are two horizontal rows of marking positions 11 delineated by parallel dotted lines. The two rows are designated $+$ and $-$ and the individual positions are identified with different values as shown. A positive multiplicand is represented in the $+$ row and a negative multiplicand is represented in the $-$ row by marks 12 made with conductive ink or pencil in positions 11 representing the value of the amount. Thus, in rectangle I there is represented a $+$ amount of 55, in II there is represented a $-$ amount of 55, in III there is represented a $+$ amount 21, and IV there is represented a $+$ amount 30, in V there is represented a $+$ amount 6, in VI there is represented a $-$ amount 2, and in VII there is represented a $+$ amount of 76.

Record sensing devices

The machine for sensing the markings on sheet R is the same as shown and described in my copending application Serial No. 214,922, filed June 21, 1938, now Patent 2,275,590, dated March 10, 1942. In this machine, the record sheet is placed in a sensing position where a platen 13 (see Fig. 2) presses the sheet against the sensing devices, of which there is one for each marking position. In Fig. 2 only two of such devices are shown and each comprises a pair of pins 14 electrically connected together and insulated from a trio of pins 15. When sheet R is tightly pressed against pins 14, 15, the conductive material 12 will make an electrical connection between one or more of the pins 15, which are electrically common, and one or both of the pins 14 depending on the length of the marks. If a mark is carefully made the full length of the marking position, all the pins will be electrically connected while a shorter mark will also effect a connection so long as it is at least long enough to bridge two of the pins.

In line with each pair of pins 14 and contacting the same through a cap 16 is a resistor 17. Thus, there are provided a number of sensing devices 14, 15 and a related resistor 17 for each marking position on the sheet R.

In Fig. 3 the sensing devices 14, 15 and resistors 17 are shown diagrammatically and grouped in accordance with the arrangement of the marking positions on sheet R. Considering one of the amount receiving rectangles on the sheet, for example, the upper one designated I, all the resistors 17 related to the tens sections for both the + and − rows are connected in parallel to a wire 18 extending to a plug socket 19 (Fig. 3a). All the resistors 17 related to the units sections for both the + and − rows are connected in parallel to a wire 20 extending to a plug socket 21 (Fig. 3a).

In the + row, all the pins 15 are connected to a wire 22 extending to a plug socket 23 and in the − row all the pins 15 are connected to a wire 24 extending to a plug socket 25. The resistors 17 all have a value of 2 megohms and these will be connected in parallel according to the value of the multiplicand. For example, where the multiplicand +55 is sensed, five resistors 17 in the tens section will be connected in parallel between socket 23 and socket 19 through wires 22 and 18. Also, five resistors 17 in the units section will be connected between socket 23 and socket 21.

Where the amount sensed is, say, −12, one resistor 17 in the tens section is connected between socket 25 and socket 19, and two resistors 17 in the units section are connected between socket 25 and socket 21.

Setting for sign of the multiplier

Sockets 23 and 25 may be connected by plug connections 26 to a pair of sockets 27, 28 or to a pair of sockets 29, 30. All sockets 27 and 30 are connected to a wire 31 and all sockets 28 and 29 are connected to a wire 32. These two wires 31 and 32 extend (Fig. 3a) through contacts 33d and 33c to wire 34 and 35, and switches 36 and 37 to negative and positive sides respectively of a battery B. Through the connections just described and with connections 26 made as in the uppermost section of Fig. 3, resistors 17 selected in accordance with a positive multiplicand are connected in parallel to the negative side of battery B, and resistors 17 selected in accordance with a negative multiplicand are connected in parallel to the positive side of battery B. It will be understood, of course, that for any section there will be a multiplicand in only one of the two related rows.

With plug connections 26 in their right hand positions as in the central section of Fig. 3, the connections are reversed so that resistors 17 selected in accordance with a positive multiplicand are connected in parallel to the positive side of battery B and resistors 17 selected in accordance with a negative multiplicand are connected in parallel to the negative side of battery B.

The setting of plug connections in one position or the other is dependent upon the sign of the multiplier for each multiplicand. Thus, if multiplicand I is to be multiplied by a positive multiplier, its related plug connections 26 are made to the left as in the uppermost section of Fig. 3 while if, for example, multiplicand II is to be multiplied by a negative multiplier its related plug connections 26 are made to the right as in the central section of Fig. 3.

Setting of multiplier amounts

In Fig. 3a are shown two potentiometers 38 and 39 designated Tens and Units. The tens potentiometer comprises a series of ninety-nine 2.5 ohm resistors in series while the units potentiometer comprises a series of one hundred .25 ohm resistors, with taps on each extending to plug sockets 40 and 41 having value identifications as shown. In order to set up a multiplier value, plug connections 42 and 43 are made from the units and tens sockets 21 and 19, respectively, to sockets 41 and 40 representing the selected multiplier value. Thus, in Fig. 3a the uppermost pair of sockets are connected for multiplication by 65, the central pair is connected for multiplication by 40, and the lowermost pair for multiplication by 25.

Preliminary adjustment

After the plug connections 42, 43 have been made and the connections 26 have also been made for the sign of the multipliers, a test sheet R is sensed. This sheet is marked 50 in each plus row of positions 11, and, while the sheet is in sensing position, key 44 is depressed. This causes current to flow through meter M (through circuit paths to be hereinafter traced), and its indicating arm will deflect to give a reading on the calibrated dial. Voltage switches 36, 37 are now adjusted until the meter indicating arm gives a reading of more than half the algebraic sum of the selected multipliers.

Now a second test sheet R, which is marked 50 in each plus and minus position, is placed in position and sensed, and with key 44 depressed the center tap switch 46 is adjusted until the meter arm reads approximately zero. Then, potentiometer 47 is adjusted until the indicating arm registers exactly zero.

The first test sheet R with 50 marked in all plus positions is then resensed, and potentiometer 45 is adjusted so that the meter reads exactly one-half the algebraic sum of the multipliers. This preliminary operation selects the voltage necessary for the selected multipliers and now the sheets R on which various multiplicands are marked may be sensed in succession, each sheet being separately placed in sensing position and key 44 depressed.

Problem

Before considering a specific problem, a brief discussion of the theory of the circuit will be given in connection with the diagrams of Figs. 5, 6 and 7. In Fig. 5, if $a$ resistors R1 are connected in parallel across a battery and series resistance R2, then the current that will flow is $$I = V \times \frac{a}{R1} \times \frac{1}{1 + a\frac{R2}{R1}} \quad (1)$$

R2 is the resistance of a metering circuit and battery. In the present machine the value of R1 is 2,000,000 ohms and the value of R2 is about 250 ohms. The ratio of R2 to R1 is then $$\frac{R2}{R1} = \frac{250}{2,000,000} = .000125$$

and may be disregarded so that Equation 1 becomes $$I = a\frac{V}{R1} \quad (2)$$

The machine has a large number of resistors R1 which are connected in the circuit by pencil marks at the points marked 14, 15 (Fig. 5) and the current value is proportional to the number of marks sensed to connect points 14, 15.

Fig. 6 shows the metering circuit wherein the line from the resistors R1 is connected into a potentiometer so that $$\frac{Rx}{Rp + Rm} = kx \quad (3)$$

Then $$Im = \frac{Rx}{Rp + Rm} \times I$$

or $$Im = k \times I$$

or using Equation 2

$$Im = k \times a\frac{V}{R1} \quad (4)$$

Fig. 7 shows a complete circuit for one product $ax$. In order to reduce the number of resistors R1 required, they are divided into two banks, one for units place and one for tens place. These are connected separately into the potentiometer with the distance along the potentiometer to the units resistor line one-tenth the distance to the tens resistor line. Therefore, one-tenth as much of the units current flows through the meter as of the tens resistor current. With this connection the resistors R1 for the units and tens places can be identical.

Two batteries are introduced into the circuit in order to obtain positive and negative products. The top bank of resistors is connected to the positive battery and the bottom bank is connected to the negative battery. If there are marks for only the top bank, $Im$ will be positive; if there are marks only for the bottom bank $Im$ will be negative. The double throw switch reverses the battery-resistor bank connections and therefore the sign of the meter current $Im$. The $a$ and the $x$ may be given their signs independently, the $a$ sign by marking in the + or − section of resistors R1 and the $x$ sign by the position of the double throw switch.

In order to obtain a sum of several products, there are more groups of resistors R1 feeding into the same potentiometer and there is a double throw switch for each group of resistors.

The specific circuits involved in controlling the meter M will now be traced. Consider the example where three multiplicands +55, +55 and +21 are to be multiplied, respectively, by +65, −40 and +25. The result to be obtained is an indication of the sum of the products +3575, −2200, and +425 which gives +1800. With sheet R containing these multiplicands in sensing position, key 44 is depressed connecting wire 31 to negative side of battery B, through contacts 33d and wire 32 to positive side of battery B, through contacts 33c. Let us consider first the circuits involved in the lowermost section of Fig. 3, i. e. those concerning +21 times +25. From wire 31 the circuit from minus side of battery B continues through socket 27, connection 26, socket 23, wire 22, tens sensing pins 15 in parallel, through two marks representing 20, two resistors 17, wire 18 to socket 19. Concurrently, a parallel circuit runs from wire 22, units sensing pins 15 in parallel, through one mark representing "one," a resistor 17, wire 20 to socket 21.

From the tens socket 19 the tens circuit continues through plug connections 43 to the 25 socket 40, where the current divides into three branches $a$, $b$ and $c$ as follows: Branch $a$ passes downwardly through twenty-four 2.5 ohm resistors 38, wire 50, ten .25 ohm resistors 39, wire 51, potentiometer 47, contacts 33a, 33b, wires 52, switch arm 46 to the preadjusted center point of battery B. Branch $b$ passes upwardly through seventy-five 2.5 ohm resistors 38, plug connection 53, a "maximum" socket 54, wire 55, potentiometer 45, wire 51 to battery B as for branch $a$. Branch $c$ passes to wire 55 as for branch $b$ and thence proceeds through meter M, 4 ohm resistor 55a and wire 51 to center of battery B. Meter M has a resistance of about 69 ohms.

From the units socket 21 the units circuit continues through plug connection 42 to the 25 socket 41, where the current divides into three branches $c$, $d$ and $e$ as follows: Branch $c$ passes downwardly through twenty-five .25 ohm resistors 39, to wire 51, and thence to battery B as for branch $a$. Branch $d$ passes upwardly through five .25 ohm resistors 39, wire 56, ninety-seven 2.5 ohm resistors 38, and to battery B as for branch $b$. Branch $e$ passes to wire 55 as for branch $d$ and thence proceeds through meter M as for branch $c$.

It is to be noted that only one-tenth as much current will flow through the meter for each pencil mark associated with units socket 21 as for each mark associated with tens socket 19 for the following reason. The current through each pencil mark is constant since the 2 megohm series current limiting resistor 17 is high in comparison to the multiplying resistors 38, 39 which is the only variable once the apparatus is adjusted. When the current reaches the latter resistors, it divides according to the point at which it enters the resistance. Since the current from each mark eventually returns to the central battery terminal, it is only necessary to determine the proportion of current for each mark which takes the meter branch and compare it with proportions for other marks as follows.

The proportion of current which takes the meter network path for marks connected through socket 19 may be expressed as:

$$I(19) = It \times \frac{62.5}{66.25 + Rk}$$

where $It$ = total current passed by marks to socket 19 and $Rk$ = effective resistance of meter, potentiometer and 4 ohm resistor and 66.25 is the total resistance of potentiometers 38 and 39 utilized in the $a$ branches above.

The proportion of current which takes the meter network path for marks connected through socket 21 may be expressed as:

$$I(21) = It \times \frac{6.25}{66.25 + Rk}$$

Examination of these two equations shows that ten times as much current goes through the meter from marks connected to socket 19 as from marks connected to socket 21. Similarly, for all other pairs of sockets 19 and 21. Furthermore, the total current passing through the meter will be the sum of the currents passing through the several branches represented by multiplier plug connections 42, 43. The potentiometer 45 simply shunts part of the current for the meter circuit around the meter to facilitate adjusting the meter to the desired scale. Plug connections 53 may be made between socket 54 and the socket 40 which is one higher in value than the highest multiplier value utilized. This connection thus cuts out part of the resistance of the meter circuit.

Referring to Fig. 3, it was stated above that wire 31 extends to negative side of battery B and that wire 32 extends to positive side of battery B, and that through setting of plug connections 26 the marks on the record sheet may be connected to either line. It will be apparent therefore that, with some marks connected in one way and others in the opposite way, the current passing through meter M will represent the difference between the current passing through the oppositely connected marks and the direction of deflection of the meter arm will indicate the sign of the result.

That this difference represents the algebraic sum of the several multiplicands and multipliers might be explained as follows. Considering the upper section of Fig. 3 and Fig. 1, the multiplicand 55 is positive in value due to its location in the upper row of section I. The related multiplier of 65 is also positive as evidenced by connections 26 made in their left hand position. As a result, the marks sensed for value 55 are connected to wire 31 and the circuits run from negative side of battery to center of battery.

Where the multiplier connections 26 are made to indicate a negative multiplier, the marks representing a positive multiplicand are connected to wire 32, so that the circuits run from positive side of battery to center of battery. Briefly, where both multiplier and multiplicand are alike in sign, the marks sensed are included in circuits between negative side and center of battery B and, where the signs are unlike, the marks are included in circuits between positive side and center of battery B. This results in a deflection of the meter indicator arm across the calibrated scale an amount proportional to the sum of the several products A times X and in a direction depending on the sign of the result.

In Fig. 4 is shown a modified arrangement by means of which the sign of the multiplicand may be designated differently than by its location in an upper or lower row of a rectangle as in Fig. 1. In the arrangement of Fig. 4, two extra marking positions 60 and 61 are provided, in the former of which a mark is made to indicate the multiplicand is minus and in the latter a mark is made to indicate the multiplicand is plus. Accordingly, only a single row of designations is required to represent a factor and its sign. Extra sensing pins 62 and 63 are provided to sense these marks so that, when the multiplicand is plus, a circuit is continuous from wire 22 through pins 63 and mark in position 61 through a wire 64 to socket 23. When the multiplicand is minus, a circuit is continuous from wire 22, through pins 62 and mark in position 60, through a wire 65 to socket 25 Depending on the setting of multiplier-sign plug connection 26, the multiplicand amount-representing mark will be connected to either wire 31 or 32 with the same effect as explained for the main form of the invention.

The meter M may be a Weston #273,0-1 milliampere movement with approximately 71 ohms internal resistance and calibrated in 100 divisions of 10 micro-amperes each. The 45 volt batteries are of heavy duty type and the 1.5 volt batteries are #6 dry-cells of any commercial variety.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a device controlled by a record upon which designations representing a multiplicand amount and its algebraic sign are made, the combination of means for sensing the amount designations, means for sensing the sign designations, a source of current, a device settable to represent the sign of a multiplier, means jointly controlled by said device and said sign sensing means for connecting the amount sensing means to either side of said source of current in accordance with the sign of the product, a plurality of resistors of equal ohmic value, connected in parallel by said amount sensing means to the selected side of said source, a multiplying potentiometer having points of connection thereto representing amounts, means for effecting connection between said selected parallel resistors and said points of connection in accordance with a multiplier amount, an indicating meter responsive to current values, controlled by said resistors and potentiometer to indicate the product of the multiplicand and multiplier amounts by the amount of deflection of its indicator and to indicate the sign of the product by the direction of such deflection.

2. In a device controlled by a record upon which designations representing a multiplicand amount are made and the location of said designations in either of two positions represents the algebraic sign of the amount, a source of current, a device settable to represent the sign of a multiplier, means controlled by said device for connecting the amount sensing means to either side of said source of current in accordance with the sign of the product, a plurality of resistors of equal ohmic value, connected in parallel by said amount sensing means to the selected side of said source, a multiplying potentiometer having points of connection thereto representing amounts, means for effecting connection between said selected parallel resistors and said points of connection in accordance with a multiplier amount, an indicating meter responsive to current values, controlled by said resistors and potentiometers to indicate the product of the multiplicand and multiplier amounts by the amount of deflection of its indicator and to indicate the sign of the product by the direction of such deflection.

3. In an apparatus controlled by a record upon which designations representing multiplicand amounts are made, each multiplicand being represented in either of two areas of the record in accordance with its algebraic sign, sensing means for each multiplicand, a plurality of devices each related to one of said sensing means and each settable in accordance with the sign of a multiplier factor, a source of current, each settable device serving to connect the sensing means of its related multiplicand to current of one polarity when the signs of both related factors are alike and to current of another polarity when the signs of both factors are unlike, a plurality of resistors of equal ohmic value for each multiplicand, connected in parallel to the selected current source and in accordance with the value of the several multiplicands sensed, a multiplying potentiometer having points of connection thereto representing amounts, means for effecting for each multiplicand, connections between the selected parallel resistors and said points of connection in accordance with mutliplier amounts, an indicating meter responsive to current values, controlled jointly by all selected resistors and said potentiometer to indicate the algebraic sum of the several products by the amount and direction of deflection of the indicator of said meter.

4. In an apparatus of the class described, an indicating meter responsive to current values, a souce of current, a potentiometer, a plurality of resistors of equal ohmic value, means settable to represent a plurality of multiplicands, means settable to represent a plurality of multipliers, means settable to represent the signs of said multiplicands, means settable to represent the signs of said multipliers, there being a multiplier for each multiplicand constituting several pairs of factors, means controlled by the settable means for each pair of factors for completing circuit connections through said meter, resistors and potentiometer of a current value and polarity proportional to the product of said pairs of factors and its sign, said connections being concurrently completed, whereby the meter will indicate the algebraic sum of the products of the several pairs of factors.

5. The invention set forth in claim 4 in which separate circuit connections are completed for each denominational order of the multiplicand factors.

REYNOLD B. JOHNSON.